(12) United States Patent
Kambala et al.

(10) Patent No.: US 9,284,201 B2
(45) Date of Patent: Mar. 15, 2016

(54) AMINE MODIFIED CLAY SORBENTS

(75) Inventors: Venkata Subba Rao Kambala, Seven Hills (AU); Ravendra Naidu, Pasadena (AU)

(73) Assignee: CRC CARE Pty Ltd, Mawson Lakes (AU)

( * ) Notice: Subject to any disclaimer, the term of this patent is extended or adjusted under 35 U.S.C. 154(b) by 669 days.

(21) Appl. No.: 13/514,572

(22) PCT Filed: Dec. 7, 2010

(86) PCT No.: PCT/AU2010/001644
§ 371 (c)(1),
(2), (4) Date: Sep. 18, 2012

(87) PCT Pub. No.: WO2011/069189
PCT Pub. Date: Jun. 16, 2011

(65) Prior Publication Data
US 2013/0023408 A1    Jan. 24, 2013

(30) Foreign Application Priority Data
Dec. 7, 2009   (AU) ................................. 2009905953

(51) Int. Cl.
| | |
|---|---|
| *B01J 20/00* | (2006.01) |
| *B01J 20/22* | (2006.01) |
| *C02F 1/28* | (2006.01) |
| *B01D 15/00* | (2006.01) |
| *B01J 20/10* | (2006.01) |
| *B01J 20/16* | (2006.01) |
| *B01J 20/32* | (2006.01) |

(Continued)

(52) U.S. Cl.
CPC ................ *C02F 1/288* (2013.01); *B01D 15/00* (2013.01); *B01J 20/10* (2013.01); *B01J 20/16* (2013.01); *B01J 20/3248* (2013.01); *B09C 1/08* (2013.01); *C02F 1/281* (2013.01); *C02F 1/285* (2013.01); *C02F 2101/301* (2013.01); *C02F 2101/36* (2013.01)

(58) Field of Classification Search
USPC ............. 51/307; 502/401, 400, 407, 408, 410
See application file for complete search history.

(56) References Cited

U.S. PATENT DOCUMENTS 3,198,842 A * 8/1965 Berrigan ................. C07C 37/18
568/657
3,443,359 A * 5/1969 Zerilli ................... G01N 30/482
95/88

(Continued)

FOREIGN PATENT DOCUMENTS

| CN | 101279248 A | 10/2008 |
|---|---|---|
| JP | 54113956 | 9/1979 |

(Continued)

OTHER PUBLICATIONS

U.S. Appl. No. 13/157,054, Mallavarapu et al.; Office Action dated Mar. 26, 2015.

(Continued)

*Primary Examiner* — James McDonough
(74) *Attorney, Agent, or Firm* — Dunlap Codding, P.C.

(57) ABSTRACT

The present invention relates to amine modified clay sorbents and methods for their use. The sorbents of the present invention have particular application for the sorption of hydrophobic contaminants, particularly constituents of AFFFs, surfactants and/or perfluorinated or polyfluorinated compounds.

11 Claims, 13 Drawing Sheets

(51) Int. Cl.
*B09C 1/08* (2006.01)
*C02F 101/30* (2006.01)
*C02F 101/36* (2006.01)

(56) References Cited

U.S. PATENT DOCUMENTS

| | | | |
|---|---|---|---|
| 3,537,994 A * | 11/1970 | House | C10M 5/00 252/403 |
| 3,594,111 A * | 7/1971 | Witcoff et al. | C08J 7/06 524/236 |
| 4,079,001 A | 3/1978 | Haase et al. | |
| 4,386,010 A * | 5/1983 | Hildebrandt | C11D 3/126 210/502.1 |
| 4,444,665 A | 4/1984 | Hildebrandt | |
| 4,916,095 A | 4/1990 | Fogler et al. | |
| 6,080,319 A | 6/2000 | Alther | |
| 6,503,740 B1 * | 1/2003 | Alther | 435/176 |
| 6,627,084 B2 * | 9/2003 | Murphy | B01J 20/28057 210/690 |
| 2003/0015473 A1 | 1/2003 | Murphy et al. | |
| 2003/0197305 A1 | 10/2003 | Collins | |
| 2004/0037894 A1 | 2/2004 | Moller et al. | |
| 2005/0014905 A1 | 1/2005 | Chung et al. | |
| 2006/0235128 A1 | 10/2006 | Wang et al. | |
| 2007/0238810 A1 | 10/2007 | Ellul et al. | |
| 2011/0017198 A1 | 1/2011 | Ebrahimi et al. | |

FOREIGN PATENT DOCUMENTS

| | | |
|---|---|---|
| JP | 60132645 | 7/1985 |
| KR | 20060068163 | 6/2006 |
| WO | WO 2011/069189 A1 | 2/2011 |
| WO | WO 2011/069189 A1 | 6/2011 |

OTHER PUBLICATIONS

U.S. Appl. No. 13/157,054; Mallavarapu et al.; Response to Office Action dated Mar. 26, 2015; 6 pages.

EP Serial No. 09831310.9; CRC Care Pty Ltd; European Search Report dated Jan. 30, 2013.

Huang, et al.; "Adsorption studies of a water soluble dye, Reactive Red MF-3B, using sonication-surfactant-modified attapulgite clay"; Journal of Hazardous Materials, Elsevier, Amsterdam, NL; Apr. 13, 2007; vol. 143, No. 1-2; pp. 541-548, XP022028066, ISSN: 0304-3894, DOI: 10.1016/J.JHAZMAT.2006.09.088.

Sanchez-Martin M, et al.; "Efficiency of different clay minerals modified with a cationic surfactant in the adsorption of pesticides: Influence of clay type and pesticide hydrophobicity"; Applied Clay Science, Elsevier Science, NL; Mar. 1, 2006; vol. 31, No. 3-4; pp. 216-228; XP028055220, ISSN: 0169-1317, DOI: 10.1016/J.Clay. 2005.07.008.

Rodriguez-Cruz, et al.; "Significance of the long-chain organic cation structure in the sorption of the penconazole and metalzxyl fungicides by organo clays"; Journal of Hazardous Materials, Elsevier, Amsterdam, NL ; Mar. 4, 2008; vol. 160, No. 1; pp. 200-207, XP025574135, ISSN 0304-3894,DOI: 10.106/J.JHAZMAT.2008. 02.102.

* cited by examiner

US 9,284,201 B2

AMINE MODIFIED CLAY SORBENTS

PRIORITY CLAIM

This application is the U.S. National Phase application under 35 U.S.C. §371 of International Application No. PCT/AU2010/001644, filed on Dec. 7, 2010, which in turn claims the benefit of Australian provisional patent application 2009905953, filed Dec. 7, 2009, the entire contents of each of which are hereby expressly incorporated herein by reference.

TECHNICAL FIELD

The present invention relates to amine modified clay sorbents and methods for their use. The sorbents of the present invention have particular application for the sorption of hydrophobic contaminants, particularly constituents of AFFFs, surfactants and/or perfluorinated or polyfluorinated compounds.

BACKGROUND

Fire suppression systems using aqueous film forming foam (AFFF) solutions are often installed in facilities containing flammable or combustible liquids because of the rapid and efficient fire extinguishing capability of such foams.

Although various types of fire fighting foams are available, AFFF is used almost exclusively because of its superior fire extinguishing capacity. AFFF formulations contain a class of chemicals known as perfluorinated compounds (PFC). Examples of PFCs include perfluorooctanesulfonic (PFOS) and perfluorooctanoic acid (PFOA). PFCs are very stable chemicals that do not change or break down in the environment, or in vivo. As a result, residues of these compounds may accumulate in soil, sediments, water or food chains. When spilled or disposed of, PFC's can enter groundwater and be transported, potentially affecting nearby water supplies.

All the constituents resulting from fire fighting exercises are considered to have adverse environmental effects. The organic constituents in AFFFs have been reported to resist biodegradation in conventional biological processes as well as contributing to operational problems. Industrial wastewater has also been implicated as a likely source of entry of PFOS and PFOA into natural waters thereby entering domestic water. Research efforts have therefore been directed towards developing a remediation method for treating AFFF wastewater containing PFCs.

Naturally occurring materials have found many applications as sorbents. However the effectiveness of such materials for the removal of contaminants can be greatly improved by tailoring a sorbent to sorption of a particular compound or class of compounds. Application of tailored materials offers several advantages including low cost of natural materials, versatility in the preparation of selective and modified materials for target contaminants and abundant availability.

As such, a need exists for sorbents which are suitable for the sorption of hydrophobic organic contaminants such as constituents of AFFFs, surfactants and/or perfluorinated compounds.

Reference to any prior art in this specification is not, and should not be taken as, an acknowledgment or any form of suggestion that this prior art forms part of the common general knowledge in any country.

DESCRIPTION

In a first aspect, the present invention provides a modified clay sorbent comprising a palygorskite clay modified with a fatty amine.

As described later, the modified clay sorbents of the present invention have particular application for the sorption of hydrophobic organic contaminants, particularly constituents of AFFFs, surfactants and/or perfluorinated or polyfluorinated compounds.

The sorbents of the present invention should be understood as agents which can bind, immobilise, or otherwise associate with a contaminant via sorption of the contaminant to the modified clay sorbent. "Sorption" as referred to herein should be understood to include adsorption of the contaminant to the surface of the sorbent and/or absorption of the contaminant into all or part of the sorbent.

The modified clay sorbents of the present invention may also be referred to herein as "amine modified clay sorbents" and such terms are used interchangeably.

As set out above, the present invention contemplates a palygorskite clay modified with a fatty amine. "Palygorskite" (also known as attapulgite) is a magnesium aluminium phyllosilicate of the formula $(Mg,Al)_2Si_4O_{10}(OH) \cdot 4(H_2O)$. Palygorskites are 2:1 clay minerals. The structure of palygorskite contains continuous planes of Si tetrahedra. The apical oxygens point alternately up and down relative to the basal oxygen plane so the structure has a chain-like characteristic.

Palygorskites have fibrous particle morphology comprising crystals elongated along the a-axis. The length of the individual fibres may vary from <1 µm to about 20 µm and have a diameter from about 0.1 to about 0.5 µm. The fibres may consist of aggregates of 10 to 35 nm wide and 5 to 10 nm thick laths in parallel orientation. Distinct striations of width varying from 4.5 to 5.0 nm have been observed along the fibre length.

The fine particle size, fibrous particle shape and internal channel of palygorskites result in them having the highest surface area among the clay minerals. Total surface area calculated from theoretical models is about 800 to 900 $m^2/g$. Experimental surface areas, however, tend to be significantly lower due to inability of experimental procedures to measure wedge shaped voids. Furthermore, not all of the theoretical surface area is available for sorption.

Palygorskites also exhibit cation exchange capacity, which is primarily due to limited isomorphous substitution of Si by Al in the tetrahedral sheet.

Palygorskites are desirable as sorbents due to their advantageous properties, such as nano-scale fibrous or acicular particle morphology and high initial surface area. These properties are particularly advantageous for sorption of hydrophobic organic contaminants where fast kinetic rates are desirable.

However, the surface of unmodified palygorskites is generally hydrophilic due to the nature of surface atomic planes and exchangeable cations. In aqueous systems, water is preferentially and strongly adsorbed onto the palygorskite surface. As a consequence, hydrophobic organic compounds are generally unable to access the palygorskite surface for sorption.

As set out above, the present invention provides a modified clay sorbent comprising a palygorskite clay "modified with" a fatty amine. Modification of palygorskite clays with a fatty amine enables sorption of hydrophobic organic contaminants by the resultant modified clay sorbent.

In the amine modified clay sorbents of the present invention, the clay surface may be acid activated prior to reaction with a fatty amine. Acid activation treatment modifies the acidity, chemical composition, texture and structure of the clay and transforms the clay into an $H^+$ form, thereby creating strong acid sites on the surface which can increase the adsorption of an amine. The acid treatment may be followed by adsorption of a fatty amine.

As referred to herein, the term "fatty amine" refers to a primary, secondary or tertiary amine or a quaternary ammonium compound comprising one or more hydrophobic organic substituents. In some embodiments, the fatty amine is a primary, secondary or tertiary amine comprising one or more hydrophobic organic substituents. In some embodiments, the fatty amine is a primary amine comprising one or more hydrophobic organic substituents.

Primary amines arise when one of three hydrogen atoms in ammonia is replaced by a hydrophobic organic substituent. Secondary amines have two hydrophobic organic substituents bound to N together with one hydrogen. In tertiary amines, all three hydrogen atoms are replaced by hydrophobic organic substituents. Cyclic amines are either secondary or tertiary amines. In some embodiments, the term "fatty amine" may also encompass a quaternary ammonium compounds comprising one or more hydrophobic organic substituents, such as HDTMA or CTMAB.

In some embodiments, the fatty amine may comprise an aliphatic amine wherein one or more of the hydrophobic organic substituents comprise an alkyl group. "Alkyl" as a group or part of a group denotes an optionally substituted straight or branched aliphatic hydrocarbon group. The group may be a terminal group or a bridging group.

Examples of aliphatic amines include octyl amine (CAS RN: 111-86-4). Lauryl amine (CAS RN: 124-22-1), Stearyl amine (CAS RN: 124-30-1), Oleyl amine (CAS RN: 112-90-3), Tallowamine (CAS RN: 61790-33-8), Cetylamine (CAS RN: 143-27-1), N-Tetradecylamine (CAS RN: 2016-42-4), Cocoamine (CAS RN: 61788-46-3), Hydrogenated tallowamine (CAS RN: 61788-45-2), Alkyl(C16 and C18-unsaturated) amine (CAS RN: 68855-63-0), Alkyl(C14-18) amine (CAS RN: 68037-91-2), Alkyl(C16-22) amine (CAS RN: 68037-92-3), Alkyl(C8-18 and C18-unsaturated) amine (CAS RN: 68037-94-5) and Alkyl(C12-18) amine (CAS RN: 68155-27-1).

In some embodiments, the fatty amine may comprise an aromatic amine wherein one or more of the hydrophobic organic substituents comprise an aryl group. "Aryl" as a group or part of a group denotes (i) an optionally substituted monocyclic, or fused polycyclic, aromatic carbocycle (ring structure having ring atoms that are all carbon) preferably having from 5 to 18 atoms per ring. Examples of aryl groups include optionally substituted phenyl, optionally substituted naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl.

The term "optionally substituted" as used throughout the specification denotes that the group may or may not be further substituted or fused with one or more non-hydrogen substituent groups. In certain embodiments the substituent groups are one or more groups independently selected from the group consisting of halogen, $=O$, $=S$, $—CN$, $—NO_2$, $—CF_3$, $—OCF_3$, alkyl, alkenyl, alkynyl, haloalkyl, haloalkenyl, haloalkynyl, heteroalkyl, cycloalkyl, cycloalkenyl, heterocycloalkyl, aryl, heteroaryl, cycloalkylalkyl, heterocycloalkylalkyl, heteroarylalkyl, arylalkyl, cycloalkylalkenyl, heterocycloalkylalkenyl, arylalkenyl, heteroarylalkenyl, cycloalkylheteroalkyl, heterocycloalkylheteroalkyl, arylheteroalkyl, heteroarylheteroalkyl, hydroxy, hydroxyalkyl, alkyloxy, alkyloxyalkyl, alkyloxycycloalkyl, alkyloxyheterocycloalkyl, alkyloxyaryl, alkyloxyheteroaryl, alkyloxycarbonyl, alkylaminocarbonyl, alkenyloxy, alkynyloxy, cycloalkyloxy, cycloalkenyloxy, heterocycloalkyloxy, heterocycloalkenyloxy, aryloxy, phenoxy, benzyloxy, heteroaryloxy, arylalkyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, alkylsulfinyl, arylsulfinyl, aminosulfinylaminoalkyl, $—C(=O)OH$, $—C(=O)R^a$, $—C(=O)OR^a$, $C(=O)NR^aR^b$, $C(=NOH)R^a$, $C(=NR^a)NR^bR^c$, $NR^aR^b$, $NR^aC(=O)R^b$, $NR^aC(=O)OR^b$, $NR^aC(=O)NR^bR^c$, $NR^aC(=NR^b)NR^cR^d$, $NR^aSO_2R^b$, $—SR^a$, $SO_2NR^aR^b$, $—OR^a$, $OC(=O)NR^aR^b$, $OC(=O)R^a$ and acyl, wherein $R^a$, $R^b$, $R^c$ and $R^d$ are each independently selected from the group consisting of H, $C_1$-$C_{12}$alkyl, $C_1$-$C_{12}$haloalkyl, $C_2$-$C_{12}$alkenyl, $C_2$-$C_{12}$alkynyl, $C_2$-$C_{10}$ heteroalkyl, $C_3$-$C_{12}$cycloalkyl, $C_3$-$C_{12}$cycloalkenyl, $C_2$-$C_{12}$heterocycloalkyl, $C_2$-$C_{12}$heterocycloalkenyl, $C_6$-$C_{18}$aryl, $C_1$-$C_{18}$heteroaryl, and acyl, or any two or more of $R^a$, $R^b$, $R^c$ and $R^d$, when taken together with the atoms to which they are attached form a heterocyclic ring system with 3 to 12 ring atoms.

In some embodiments each optional substituent is independently selected from the group consisting of: halogen, $=O$, $=S$, $—CN$, $—NO_2$, $—CF_3$, $—OCF_3$, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, hydroxy, hydroxyalkyl, alkyloxy, alkyloxyalkyl, alkyloxyaryl, alkyloxyheteroaryl, alkenyloxy, alkynyloxy, cycloalkyloxy, cycloalkenyloxy, heterocycloalkyloxy, heterocycloalkenyloxy, aryloxy, heteroaryloxy, arylalkyl, heteroarylalkyl, arylalkyloxy, amino, alkylamino, acylamino, aminoalkyl, arylamino, sulfonyl, alkylsulfonyl, arylsulfonyl, aminosulfonyl, aminoalkyl, $—COOH$, $—SH$, and acyl.

As set out above, fatty amines as referred to herein comprise one or more hydrophobic organic substituents (such as an alkyl or aryl group as referred to above). Typically, an organic substituent is of sufficient length to be lipophilic or hydrophobic. In some embodiments, one or more of the hydrophobic organic substituents comprises at least 8, 9, 10, 11, 12, 13, 14, 15, 16, 17, 18, 19, 20, 21, 22, 23, 24, 25, 26, 27, 28, 29 or 30 carbon atoms. In some embodiments, one or more of the hydrophobic organic substituents comprises between 8 and 18 carbon atoms. Examples of suitable fatty amines include: lauryl, octyl, stearyl, oleyl, cetyl, and tallow amines, alkyl (C16 and C18-unsaturated) amine, alkyl(C14-18) amine, alkyl(C16-22) amine, alkyl(C8-18 and C18-unsaturated) amine, and alkyl(C12-18) amine.

In some embodiments, the fatty amine comprises oleyl amine, octyl amine or a mixture thereof.

In a second aspect, the present invention provides a method for separating a contaminant from a sample containing the contaminant, the method comprising contacting the sample with a modified clay sorbent according to the first aspect of the invention under conditions suitable for sorption of the contaminant to the modified clay sorbent.

"Separating" a contaminant from a sample containing the contaminant should be understood to include any reduction of the amount of contaminant in the sample after contact with the modified clay sorbent relative to the amount of contaminant in the sample prior to contacting of the sample with the modified clay sorbent. As set out above, separation of a contaminant from a sample is effected by sorption of the contaminant in the sample to the modified clay sorbent thus immobilising the contaminant on the sorbent and removing it from the sample. In light of the above separating a contaminant from a sample may include complete or partial separation between the contaminant and sample.

The sample for use in accordance with the second aspect of the invention may be any sample which contains a contaminant. When the contaminant is an environmental contaminant, the sample may be an environmental sample such as a water sample, a soil sample, a soil dilution sample, a sediment sample, a gaseous or atmospheric sample and the like. In some embodiments the sample may be an effluent sample from industry including liquid effluents such as wastewater, gaseous effluents, solid effluents or contaminated land sites. In some embodiments the sample may be environmental water or air for which the removal or one or more contaminants is desirable. For example, the modified clay sorbent may be incorporated into air filters or water filters to produce air or water for human or animal consumption or industrial or agricultural use.

In light of the foregoing, the sample may be contacted with the modified clay sorbent in any suitable manner.

For example, in some embodiments, an effective amount of the modified clay sorbent may be stirred in a settling tank or other reaction vessel or structure into which an effluent containing a contaminant may be pumped. In the vessel, the effluent may be contacted with the modified clay sorbent and sorption of the contaminant to the modified clay sorbent may occur. Following sorption of the contaminant by the modified clay sorbent, the modified clay sorbent with associated contaminant may be separated from the remaining liquid (now having a reduced level of contaminant) by any suitable means, such as flocculation, filtration, sedimentation, centrifugation or the like.

In some embodiments, a liquid sample may be introduced into and/or pumped through one or more reactors, fluidized beds, columns, filters or landfills containing the modified clay sorbent such that outlet liquid from the above structures will have reduced contaminant concentration due to sorption of the contaminant by the modified clay sorbent in the structure.

The structure housing the modified clay sorbent may be on a large scale such as for the treatment of industrial effluents or may be on a smaller scale such as respirator filters, personal or domestic water filters and the like.

In some embodiments, the sample may be in situ and the modified clay sorbent may be applied to the sample. For example, a modified clay sorbent may be applied to a pond, waterway, soil or land site which comprises the contaminant.

After sorption of a contaminant by the modified clay sorbent, the modified clay sorbent may be disposed of and/or the contaminant may be desorbed from the modified clay sorbent and the modified clay sorbent may then be reused. An example of a suitable desorption method includes solvent extraction using methanol.

As described later, once adsorbed to a sorbent of the present invention, contaminants (including at least perfluorinated compounds), do not substantially desorb from the sorbent under environmental conditions for at least a defined period of time. For example, in some embodiments, once adsorbed to a sorbent of the present invention, contaminants (including at least perfluorinated compounds), do not substantially desorb from the sorbent under environmental conditions for at least 15 days, at least 30 days, at least 45 days, at least 90 days, at least 120 days, at least 150 days, at least 180 days, at least 210 days, at least 240 days, at least 270 days or at least 300 days.

In light of the above, in some embodiments, a sorbent may be incorporated into a sample in situ in the environment (such as soil or water in situ) and remain in the sample in order to bind and reduce the bioavailability of the contaminant in the sample.

The present method contemplates sorption of any suitable contaminant that may be adsorbed to, or absorbed by, an amine modified clay sorbent according to the first aspect of the invention.

In some embodiments, the contaminant is a hydrophobic organic contaminant. In these embodiments, sorption between the hydrophobic organic contaminant and the modified clay sorbent may occur through adsorption or absorption of the hydrophobic organic contaminant to the hydrophobic tail groups of the fatty amine in the modified clay sorbent.

Examples of hydrophobic organic contaminants which may be adsorbed or absorbed using the modified clay sorbents of the present invention include, for example, phenol, phenol derivatives, BTEX (such as benzene, toluene, ethylbenzene and xylenes) and the like.

In some embodiments, the modified clay sorbents of the present invention have particular application for the sorption of surfactants. As would be readily understood by a person skilled in the art, a "surfactant" is an amphipathic molecule comprising both a hydrophobic portion and hydrophilic portion. Examples of surfactants include anionic surfactants, cationic surfactants, zwitterionic surfactants and nonionic surfactants. In each case, sorption between the surfactant and the modified clay sorbent may occur through adsorption or absorption of a hydrophobic tail of the surfactant to a hydrophobic tail group of a fatty amine in the modified clay sorbent.

In some embodiments, the contaminant comprises an anionic surfactant. In the case of an "anionic surfactant", the hydrophilic portion of the molecule generally carries a negative charge at least at a pH of 7 or greater. As such, the term "anionic surfactant" may include molecules such as carboxylic acids which may form an anion (ie. a conjugate base) at a pH of 7 or greater, but which may not necessarily be in an anionic form at a pH lower than 7. For example a carboxylic acid surfactant in an environmental sample may be regarded as an anionic surfactant even if the carboxylic acid surfactant is not necessarily in an anionic form until it is in the presence of a base such as a basic cationic dye. Exemplary anionic surfactants include, for example, linear alkylbenzene sulfonate (LAS), sodium dodecyl sulfate (SDS), fluorinated anionic surfactants such as perfluorooctane sulfonate (PFOS) or perfluorooctanoic acid (PFOA), and the like.

In some embodiments, the contaminant is a perfluorinated or polyfluorinated hydrophobic contaminant. Perfluorinated compounds (PFCs) refer to a class of organofluorine compounds that have all hydrogens replaced with fluorine on a carbon chain. Such compounds may be an unsubstituted fluorocarbon or may also contain at least one different atom or functional group. PFCs may be used to make other materials stain, oil, and water resistant, and are widely used in diverse applications. PFCs persist in the environment as persistent organic pollutants, but unlike PCBs, they are not known to degrade by any natural processes due to the strength of the carbon-fluorine bond. There are many PFCs, but the two most studied compounds are:

PFOA or perfluorooctanoic acid, used to make fluoropolymers such as Teflon, among other applications; and PFOS or perfluorooctanesulfonic acid, used in the semiconductor industry, 3M's former Scotchgard formulation, and 3M's former fire-fighting foam mixture.

Further examples of PFCs include:

PFNA or perfluorononanoic acid, used as surfactant in the emulsion polymerization of fluoropolymers, like PFOA;

PFBS or perfluorobutanesulfonic acid, used as a replacement for PFOS in 3M's reformulated Scotchgard;

POSF or perfluorooctanesulfonyl fluoride, used to make PFOS-based compounds;

PFOSA or perfluorooctanesulfonamide, formerly used in 3M's Scotchgard formulation; and FC-75, a 3M Fluorinert liquid and perfluorinated cyclic ether.

Polyfluorinated compounds, such as fluorotelomers, can serve as precursors that degrade to form perfluorinated carboxylic acids, such as PFOA and PFNA.

The amine modified clay sorbents of the present invention also have particular application for the sorption of contaminants which are constituents of aqueous film forming foams (AFFF), such as the fluorinated surfactants mentioned above. Exemplary AFFFs include Light Water™ (3M, St. Paul, Minn., USA) and Ansulite (Ansul Incorporated, Marinette, Wis., USA).

As set out above, a sample is contacted with an amine modified clay sorbent according to the first aspect of the invention "under conditions suitable for sorption of the contaminant to the modified clay sorbent". Such conditions include suitable concentrations of the sample and modified clay sorbent, suitable temperature, suitable pressure, suitable pH and the like. In general, these could be determined by a person skilled in the art for any combination of contaminant and modified clay sorbent.

In some embodiments, it has been determined that the modified clay sorbents of the present invention can adsorb or absorb hydrophobic contaminants, such as PFOS and PFOA, from wastewater over a broad range of TOC, pH, temperature and salinity.

Exemplary embodiments of the present invention are further described by the following non-limiting examples:

EXAMPLE 1

Material Modification

Figure 1:
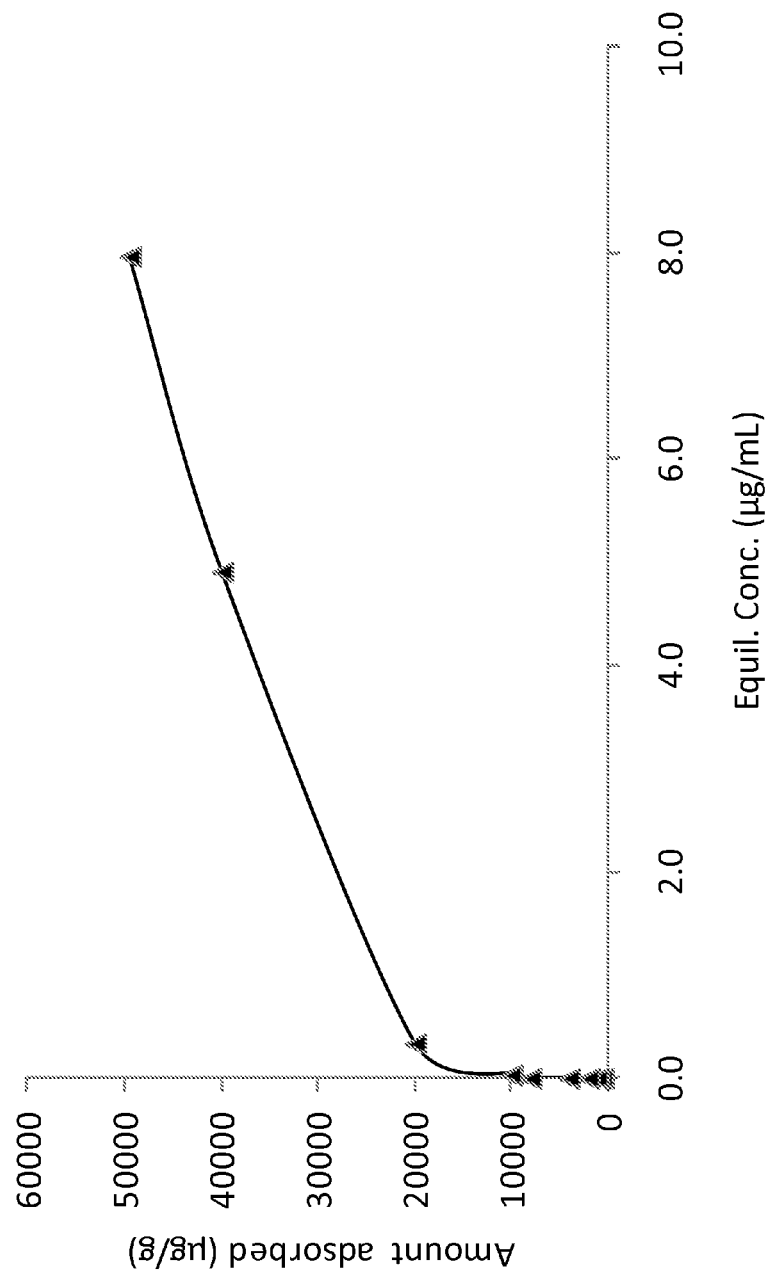
FIG. 1 shows the adsorption isotherm for MatCARE™.

Naturally occurring palygorskite clay obtained in Australia was used as raw material for the preparation of an embodiment of a sorbent according to the present invention. For ease of reference, this embodiment is referred to hereafter by its proposed trade name of MatCARE™.

Palygorskite clay was ground and sieved to obtain 2 mm particles. The clay material was initially treated with dilute acid (0.2 M) and left overnight (6 h) in the acid at room temperature. The acid treated material was then washed several times to remove the excess acid and obtain chlorine free material. The washed material was air dried at room temperature. The acid activation treatment modifies the acidity, chemical composition, texture and structure of the clay and transforms the clay into an $H^+$ form, thereby creating strong acid sites on the surface which can increase the adsorption of the amine mixture in the process of preparing MatCARE™. The acid treatment step was followed by adsorption of an alcoholic mixture of oleyl amine (560 mmol) and octyl amine (120 mmol) with constant stirring. The material was left overnight (8 h) in the alcoholic mixture of amines and subsequently washed with distilled water to remove the excess amine mixture. The final material was obtained by air drying to constant mass.

EXAMPLE 2

Adsorption and Desorption Studies in Soil

Sorption experiments were conducted with MatCARE™ to determine its adsorption capacity for PFOS. The experiments were done by equilibrating MatCARE™ with aqueous solutions of PFOS varying in the concentration range of 0 to 500 ppm for 24 hrs. The solutions were then centrifuged, filtered and subsequently analyzed using HPLC-MS. This was followed by a set of desorption experiments.

PFOS was quantified in the impacted soils using 1:1 ethyl acetate:methanol with 7% orthophosphoric acid as the extracting solvent. Treatability studies were carried out by the addition of MatCARE™, the naturally modified material with the highest sorption capacity at different doses to the impacted soils and also in some spiked soils to account for any hot spot present in a possible remediation site. The treated soils were incubated at 60% maximum water holding capacity in two temperature controlled rooms (25° C. and 37° C.) to observe the effect of temperature on the release characteristics of PFOS. The amounts of PFOS that became bioavailable with time were determined after 0, 15, 30, 45 and 90 days.

Figure 2:
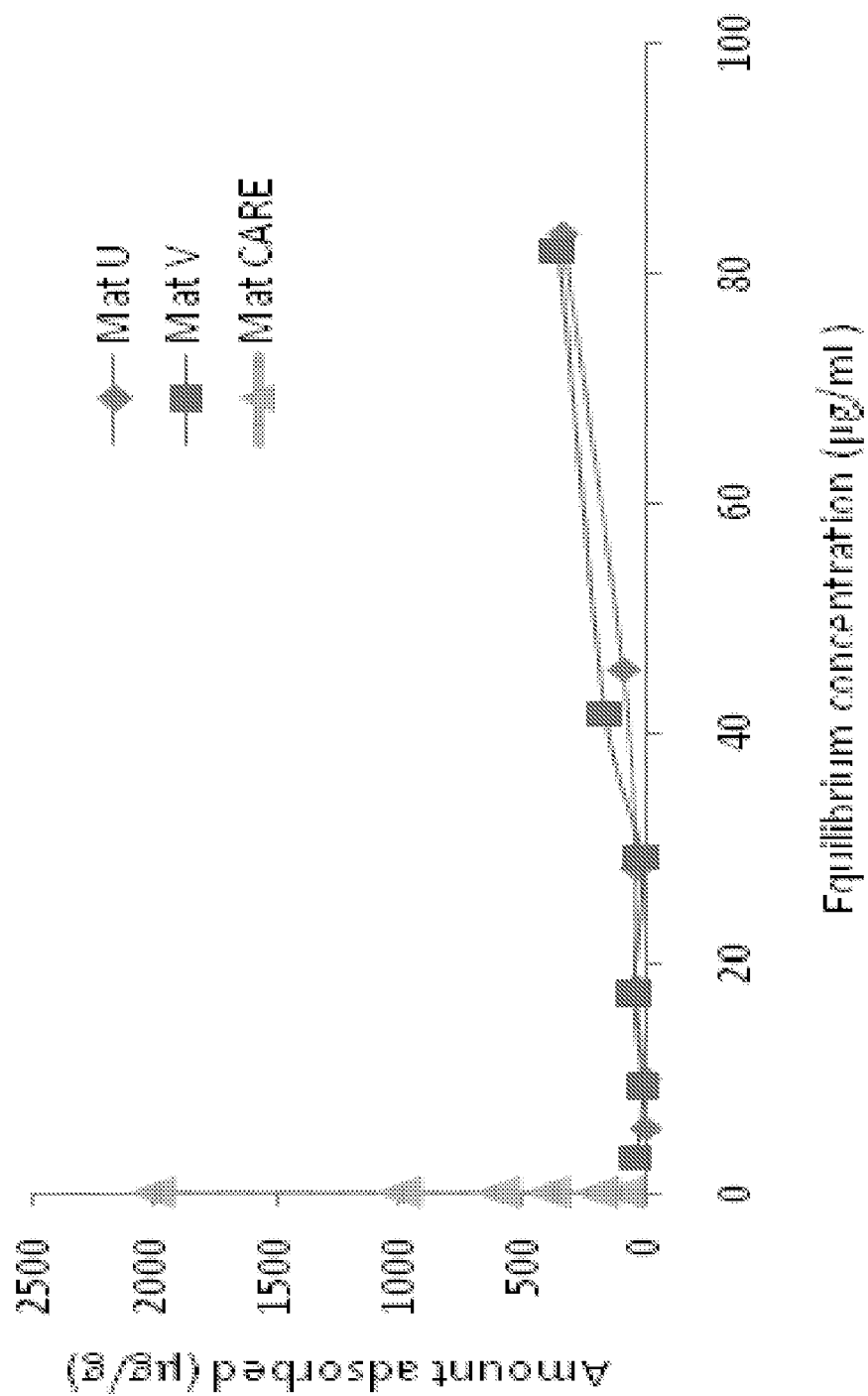
FIG. 2 shows the adsorption efficiency of PFOS on Mat U, Mat V, and MatCARE™ against the equilibrium concentration.

MatCARE™ was found to adsorb PFOS at a considerably high level (50 mg·g$^{-1}$) as seen from the adsorption isotherm for MatCARE™ (FIG. 1). The results presented in FIG. 2 show that the adsorption capacity of PFOS on MatCARE™ was higher in MatCARE™ than unmodified palygorskite (MatU) and acid-only treated palygorskite (MatV).

Figure 3A:
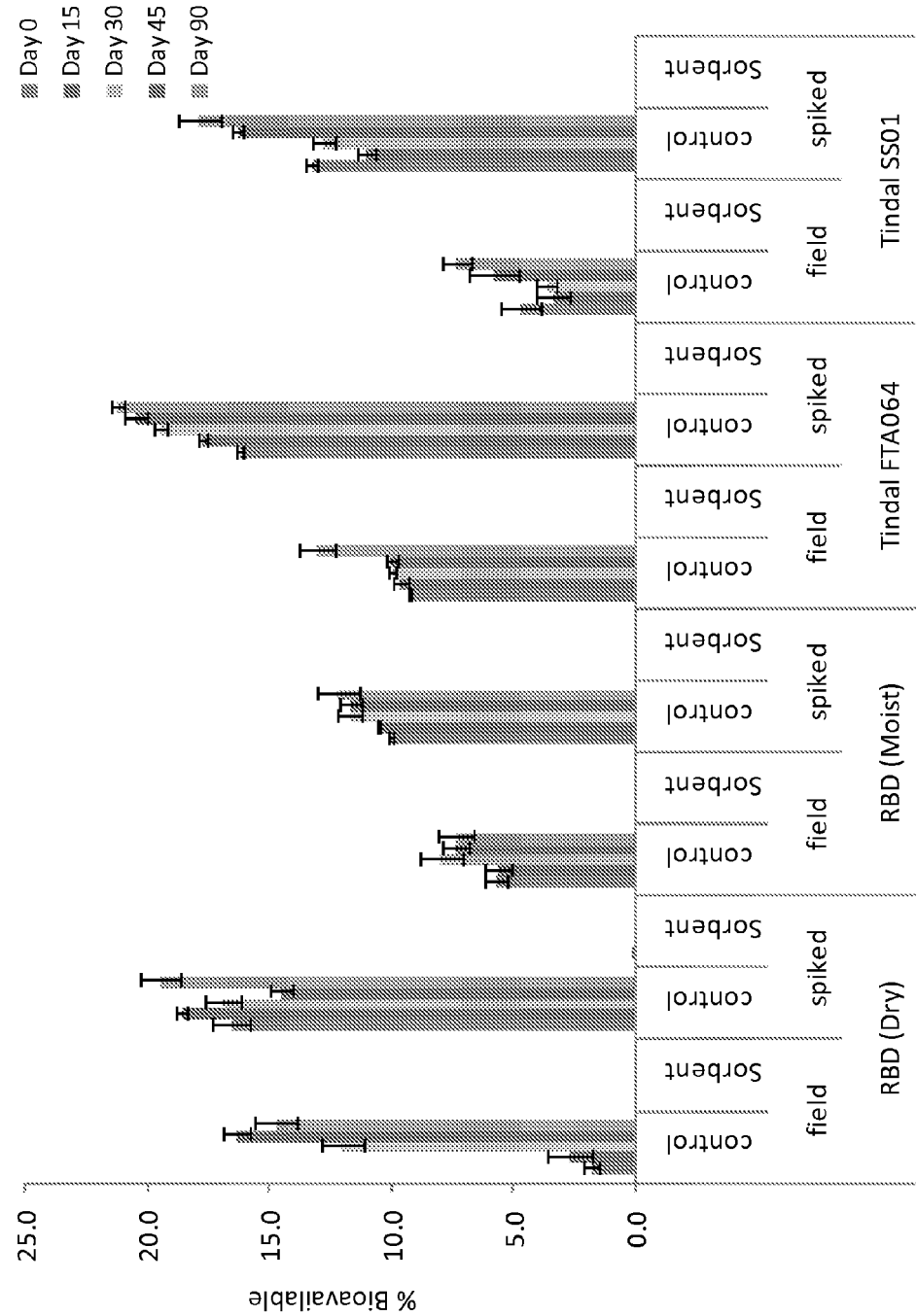
FIG. 3A shows the results of a desorption study for four different field contaminated and spiked soils at 25° C.
Figure 3B:
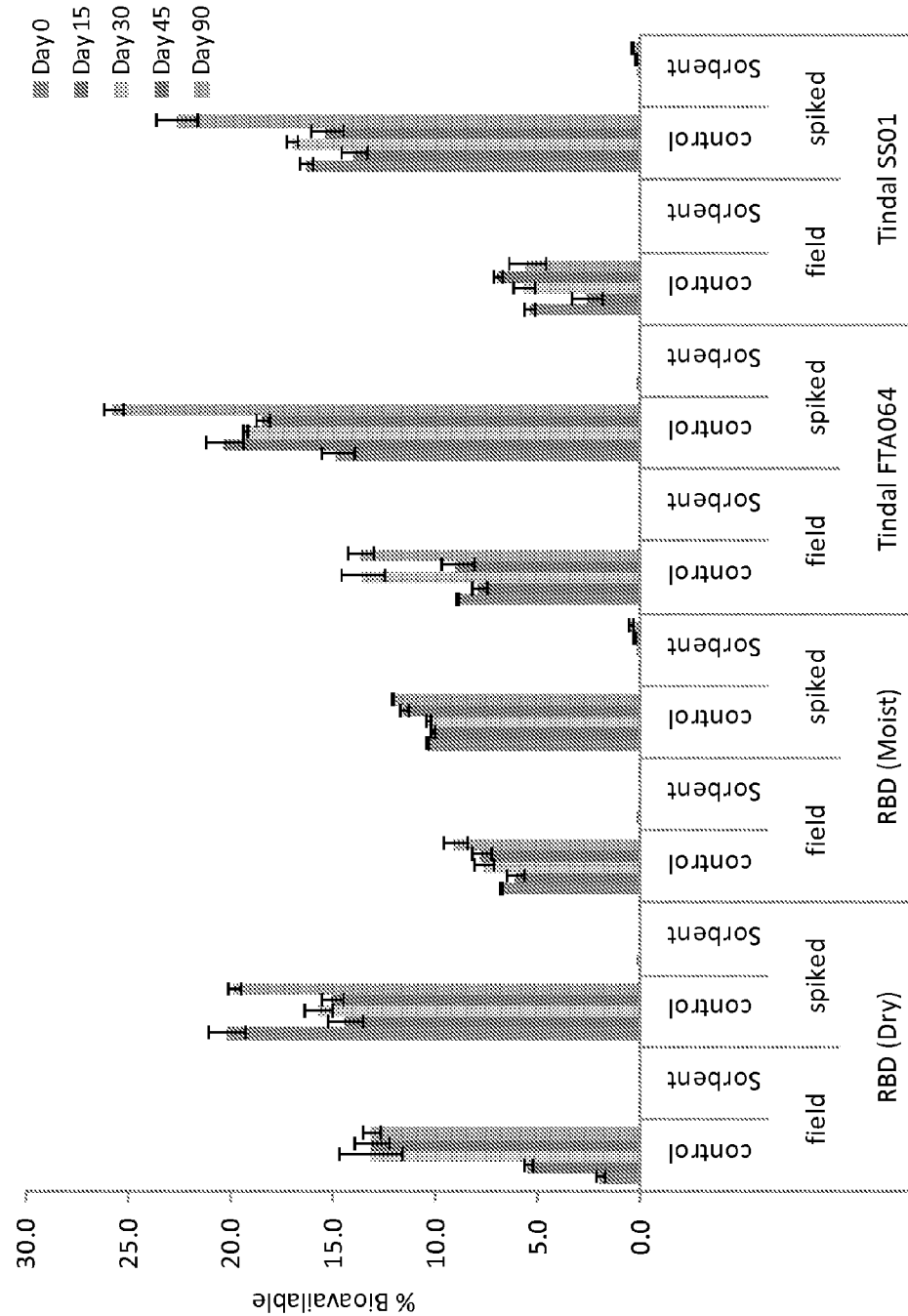
FIG. 3B shows the results of a desorption study for four different field contaminated and spiked soils at 37° C.

Results from the treatability study performed on the field contaminated soils show that MatCARE™ has a very high capacity to adsorb PFOS and hence to immobilize it. Only in a few cases, could an insignificant amount of desorption be found during the entire 90 day incubation period. FIGS. 3(A) and (B) show the results of a desorption study at 25° C. and 37° C. temperatures, respectively. Four soils (RBD, RBD moist, Tindal FTA064, and Tindal SS01) from the impacted areas were amended with MatCARE™ at 100 g·kg$^{-1}$ dosage rate. The RBD soil with a residual concentration of 1.83 ppm PFOS, showed no desorption during the entire 90 day period irrespective of the incubation temperatures (25° and 37° C.). Similar results can be found in case of the Tindal FTA064 soils, which had a PFOS concentration of 16.17 ppm. For these soils no release occurred even for the spiked samples with PFOS concentration of 102 and 116 ppm, respectively.

In the case of the RBD moist soil, which had a very high PFOS concentration (74.38 ppm), no release could be detected for the actual field samples, but for the spiked ones containing PFOS concentration as high as 175 ppm, only release of 0.75 ppm PFOS was observed at 37° C. after 90 day incubation period. The results are similar for the Tindal SS01 soils. While no release could be detected for the actual field soils containing a PFOS concentration of 9.26 ppm, only 0.37 ppm release was observed in the case of the spiked samples with PFOS concentration over 100 ppm. No release of PFOS was detected even for the spiked RBD moist and Tindal SS01 soils incubated at 25° C.

EXAMPLE 3

Batch Studies (Water)

The adsorption of AFFF technical grades Ansulite (3%), PFOS and AFFF wastewater to MatCARE™ was tested in triplicate by the addition of 20 ml of the usable concentration in various amounts of a sorbent in a 50 ml tube. These tubes were rotated for 2-20 h, centrifuged, filtered and then subjected to analysis using HPLC.

Figure 4:
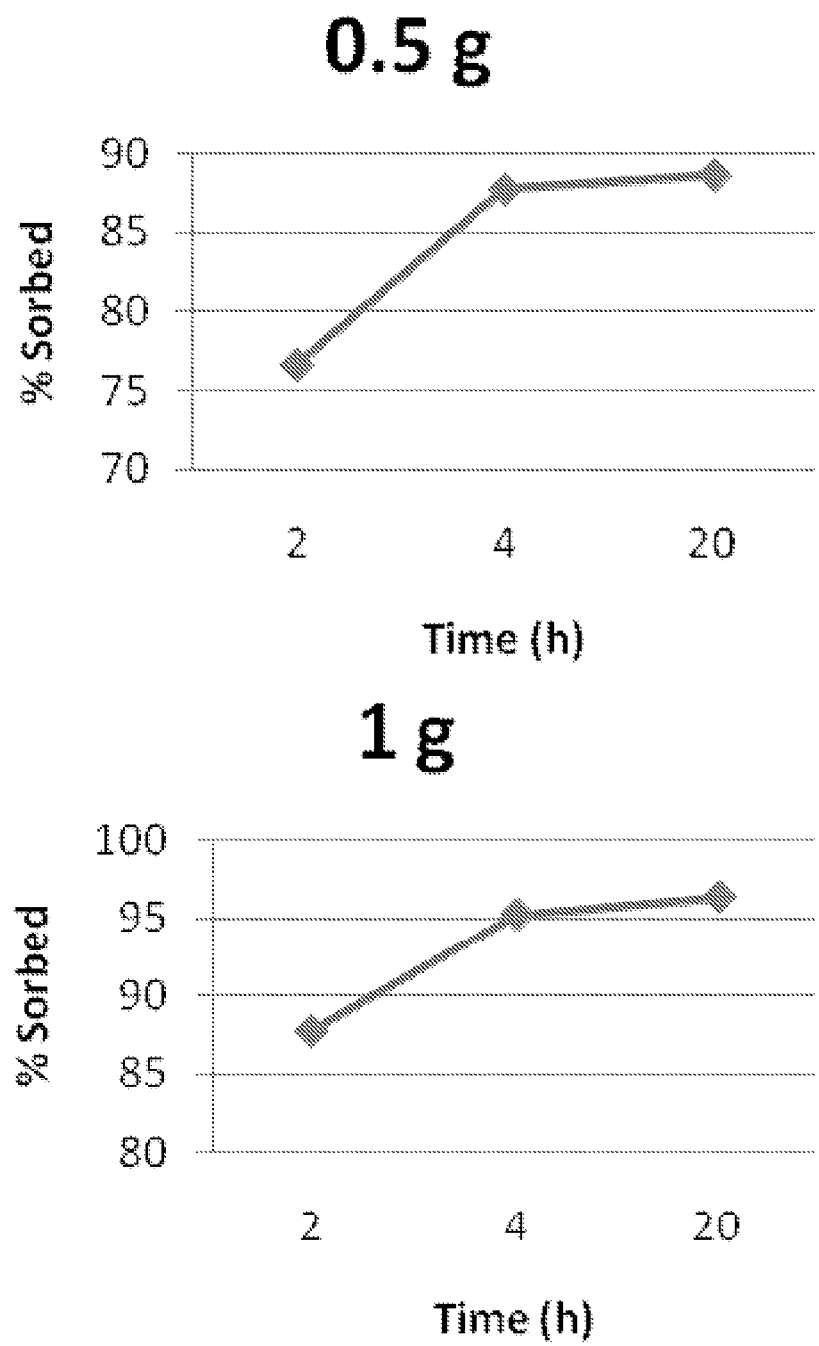
FIG. 4 shows the removal efficiency of Ansulite (3%) using MatCARE™ at 0.5 g (upper panel) or 1 g (lower panel).
Figure 5:
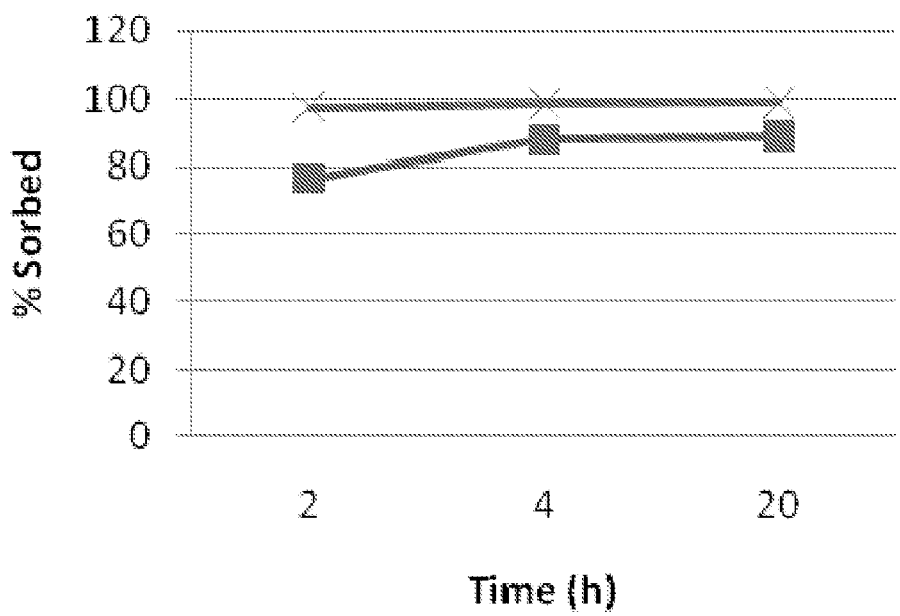
FIG. 5 shows the removal efficiency of AFFF wastewater using MatCARE™.
Figure 6:
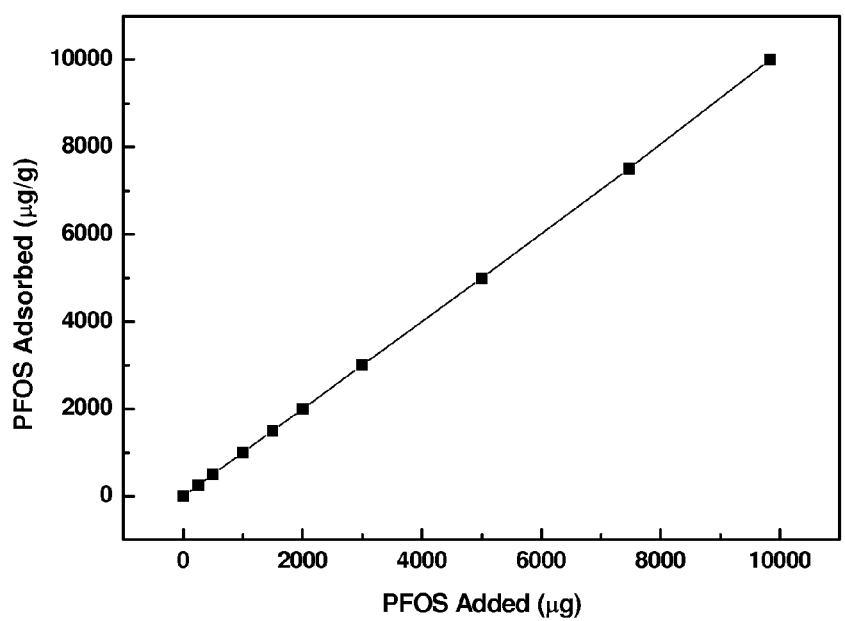
FIG. 6 shows the adsorption of PFOS on 0.1 g MatCARE™.

In order to find the optimum adsorbent dose of Mat-CARE™ and also contact time for maximum removal of contaminants, a series of 20 ml samples of Ansulite, PFOS and AFFF wastewater were shaken for 2-20 hrs with adsorbent doses ranging from 0.1-1 g. The initial concentrations of technical grade ansulite were made up of 3% solutions (97 ml water and 3 ml Ansulite). It was observed that the removal of ansulite increased with increasing adsorbent dosage as shown in FIG. 4. The removal of ansulite at an adsorbent dosage of 1 g was found to be 96%. Hence, 1 g was selected as the best dosage of adsorbent. The removal efficiency of AFFF wastewater is presented in FIG. 5. It is clearly shown that the dose of adsorbent and time was significantly less for 99% removal of contaminants in AFFF wastewater. Studies were also conducted with solutions of PFOS in water to determine the adsorption capacity of MatCARE™. These results are shown in FIG. 6.

EXAMPLE 4

Column Study (Water)

A fixed bed column experiment was conducted using a column of 25 mm diameter and 500 mm length. The column was packed with MatCARE™ to a depth of 300 mm. The column was charged with AFFF bearing wastewater in an up flow mode with a volumetric flow rate of 5.5 ml/min.

The removal of PFOS and PFOA from wastewater was 99% after 60 liters of wastewater was passed through the column. Table 1, below, shows the HPLC analysis results.

TABLE 1

| HPLC analysis of wastewater by volume after passage through column | | |
|---|---|---|
| Sample | PFOS (ppm) | PFOA (ppm) |
| AFFF Wastewater (Initial Concentration) | 6.33 | 2.16 |
| 3 L | BDL | BDL |
| 6 L | BDL | BDL |
| 9 L | BDL | BDL |
| 18 L | BDL | BDL |
| 27 L | BDL | BDL |
| 36 L | BDL | BDL |
| 45 L | BDL | BDL |
| 60 L | BDL | BDL |

BDL: Below Detection Limit

EXAMPLE 5

Effect of Ionic Strength on PFOS Adsorption by MatCARE™

20 ml of PFOS at various concentrations (0, 12.5, 25, 50, 75, 100, 150, 250, 375, 500 µg/ml) in 0.005 M $Ca(NO_3)_2$ or $NaNO_3$ aqueous solution was added to 1 g or 100 mg MatCARE™. After four-hours shaking, samples were centrifuged and filtrated for LC-MS analysis.

As shown in Table 2, below, PFOS was nearly completely adsorbed on MatCARE™ at all tested concentrations of PFOS.

TABLE 2

| Adsorption efficiency of MatCARE ™ or Composite material for PFOS. | | | | | |
|---|---|---|---|---|---|
| | | MatCARE ™ 0.005M $Ca(NO_3)_2$ | | MatCARE ™ 0.005M $NaNO_3$ | |
| Test | PFOS (µg) | Adsorbed PFOS | Adsorption ratio | Adsorbed PFOS | Adsorption ratio |
| T0 | 0 | 0 | 0 | 0 | 0 |
| T1 | 250 | 234.4 | 93.8% | 234.7 | 93.9% |
| T2 | 500 | 484.5 | 96.9% | 484.6 | 96.9% |
| T3 | 1000 | 969.0 | 96.9% | 984.6 | 98.5% |
| T4 | 1500 | 1468.9 | 97.9% | 1484.7 | 99.0% |
| T5 | 2000 | 1968.9 | 98.4% | 1966.0 | 98.3% |
| T6 | 3000 | 2937.7 | 97.9% | 2969.3 | 99.0% |
| T7 | 5000 | 4937.7 | 98.8% | 4966.7 | 99.3% |
| T8 | 7500 | 7437.8 | 99.2% | 7469.2 | 99.6% |
| T9 | 10000 | 9937.6 | 99.4% | 9969.0 | 99.7% |

Figure 7:
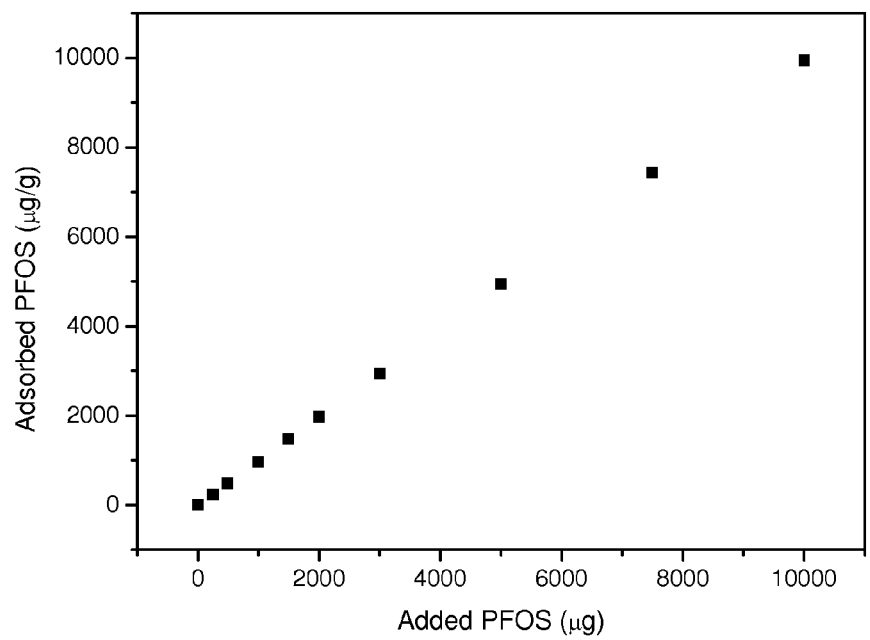
FIG. 7 shows the adsorption of PFOS in 0.005M $Ca(NO_3)_2$ on MatCARE™.
Figure 8:
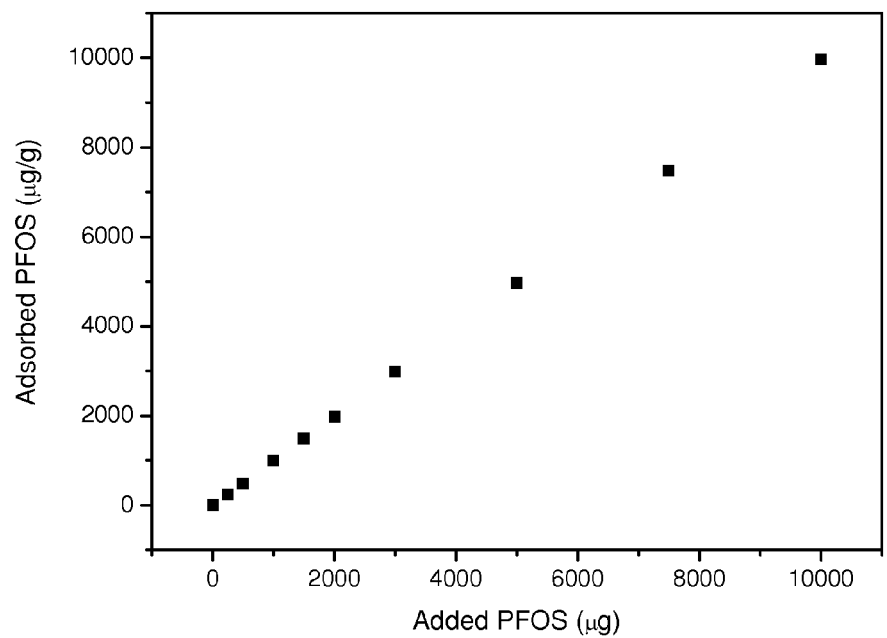
FIG. 8 shows adsorption of PFOS in 0.005M $NaNO_3$ on MatCARE™.

Furthermore, as shown in FIGS. 7 and 8, the adsorption efficiency of MatCARE™ for PFOS was not influenced by the presence of $Ca(NO_3)_2$ or $NaNO_3$, which indicates that the ionic strength of a sample (at least at the tested concentrations) did not significantly inhibit sorption of PFOS by MatCARE™. Identical results were obtained for 100 mg and 1 g of MatCARE™.

EXAMPLE 6

PFOS Adsorption Efficiency of 50 mg MatCARE™ Using High PFOS Concentrations 20 ml of PFOS at various concentrations (0, 300, 500, 750 and 1000 µg/ml) in water solution was added to 50 mg MatCARE™. After four-hours shaking, samples were centrifuged and filtrated for LC-MS analysis.

Figure 9:
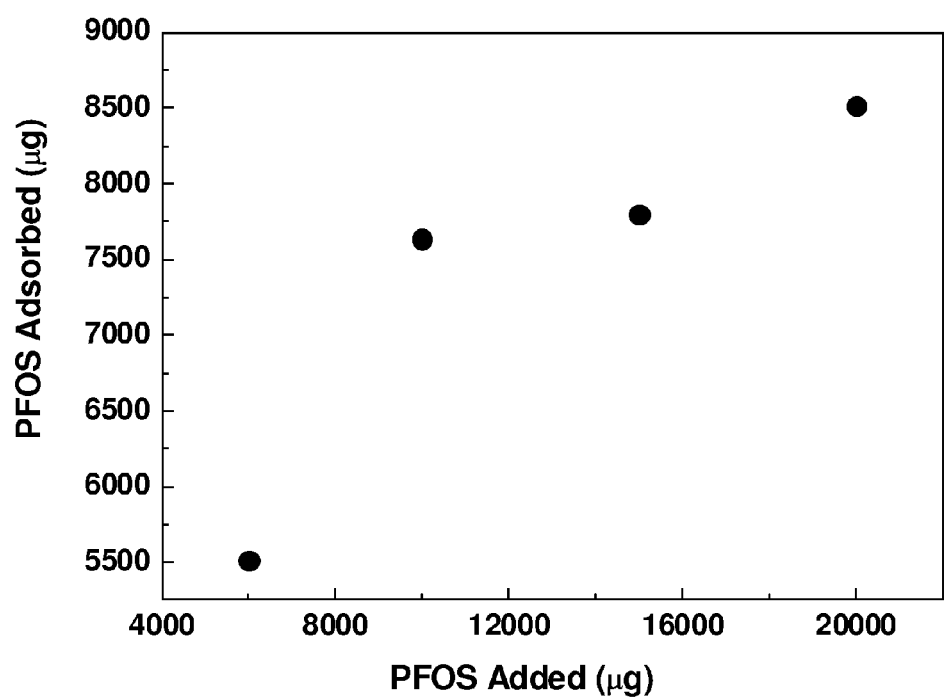
FIG. 9 shows a graph of the adsorption of PFOS in water using 50 mg of MatCARE™.
Figure 10:
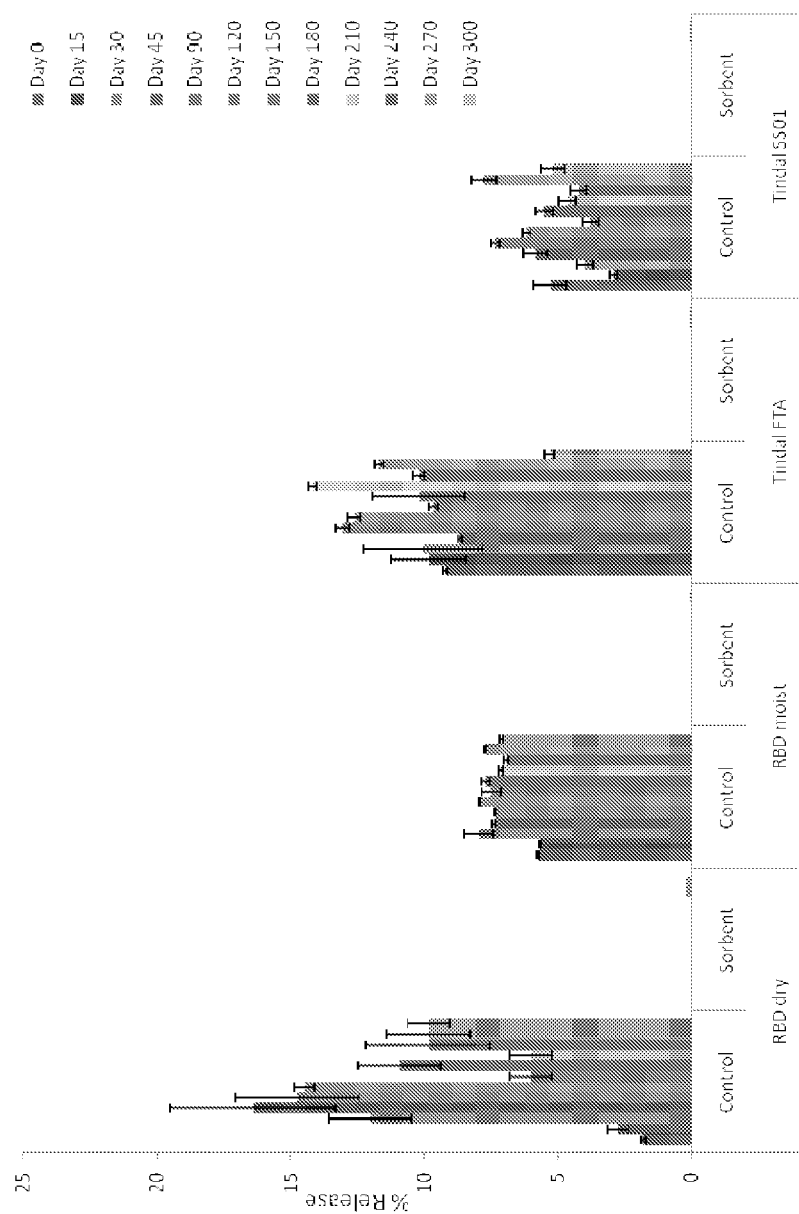
FIG. 10 shows the results of a desorption study for four different field contaminated soils at 25° C. over 300 days.
Figure 11:
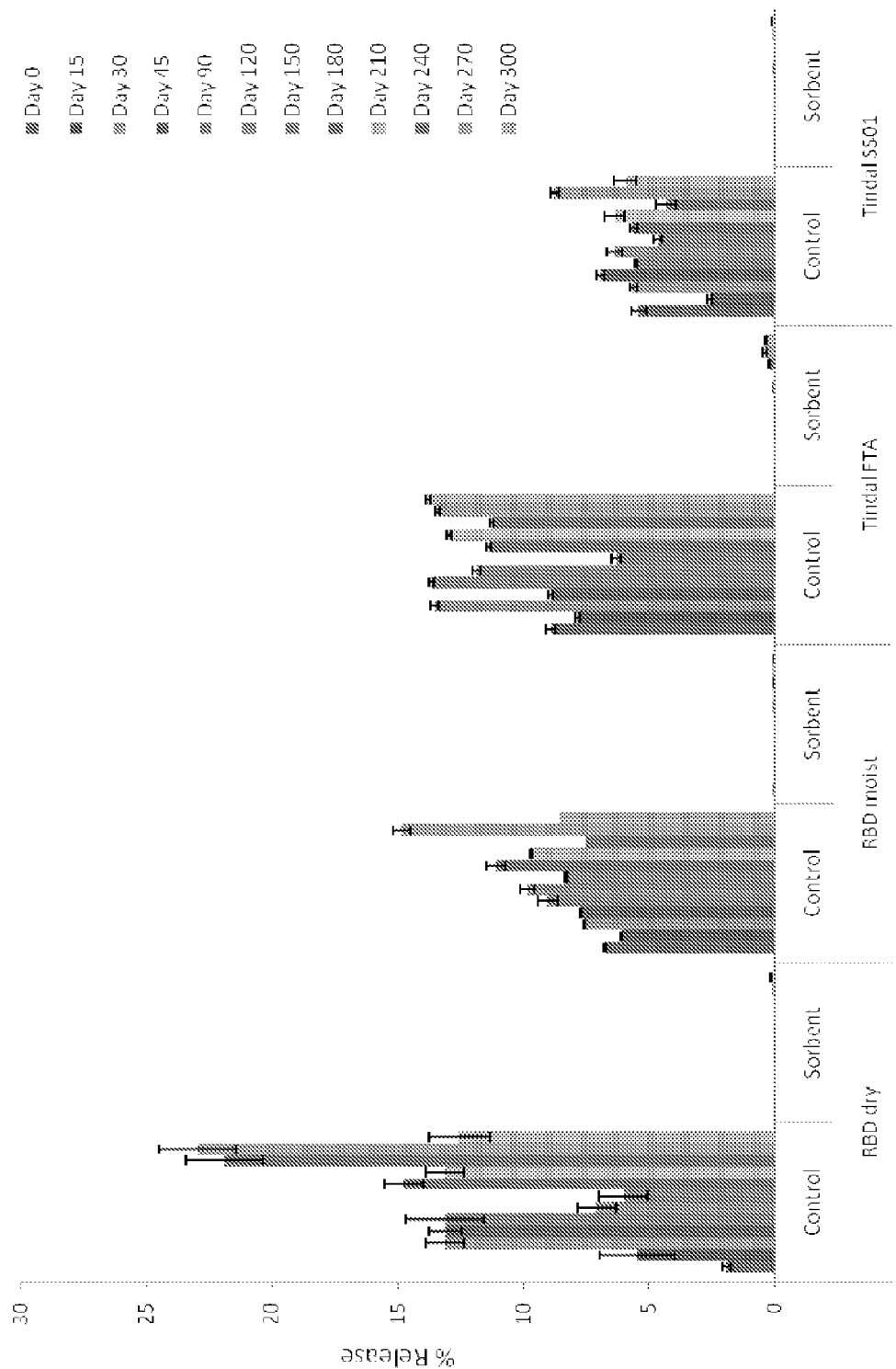
FIG. 11 shows the results of a desorption study for four different field contaminated soils at 37° C. over 300 days.
Figure 12:
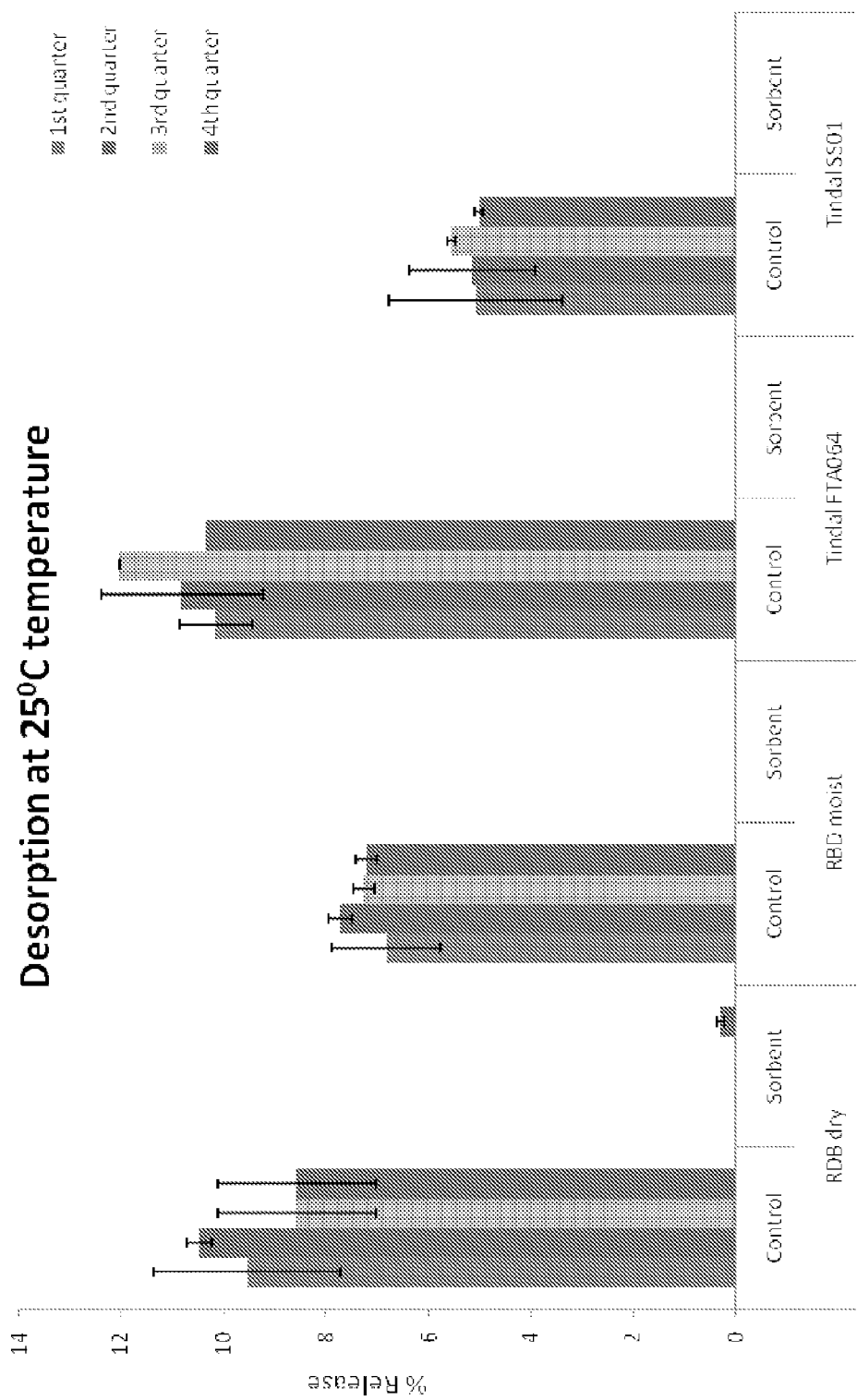
FIG. 12 shows the results of a desorption study for four different field contaminated and spiked soils at 25° C.
Figure 13:
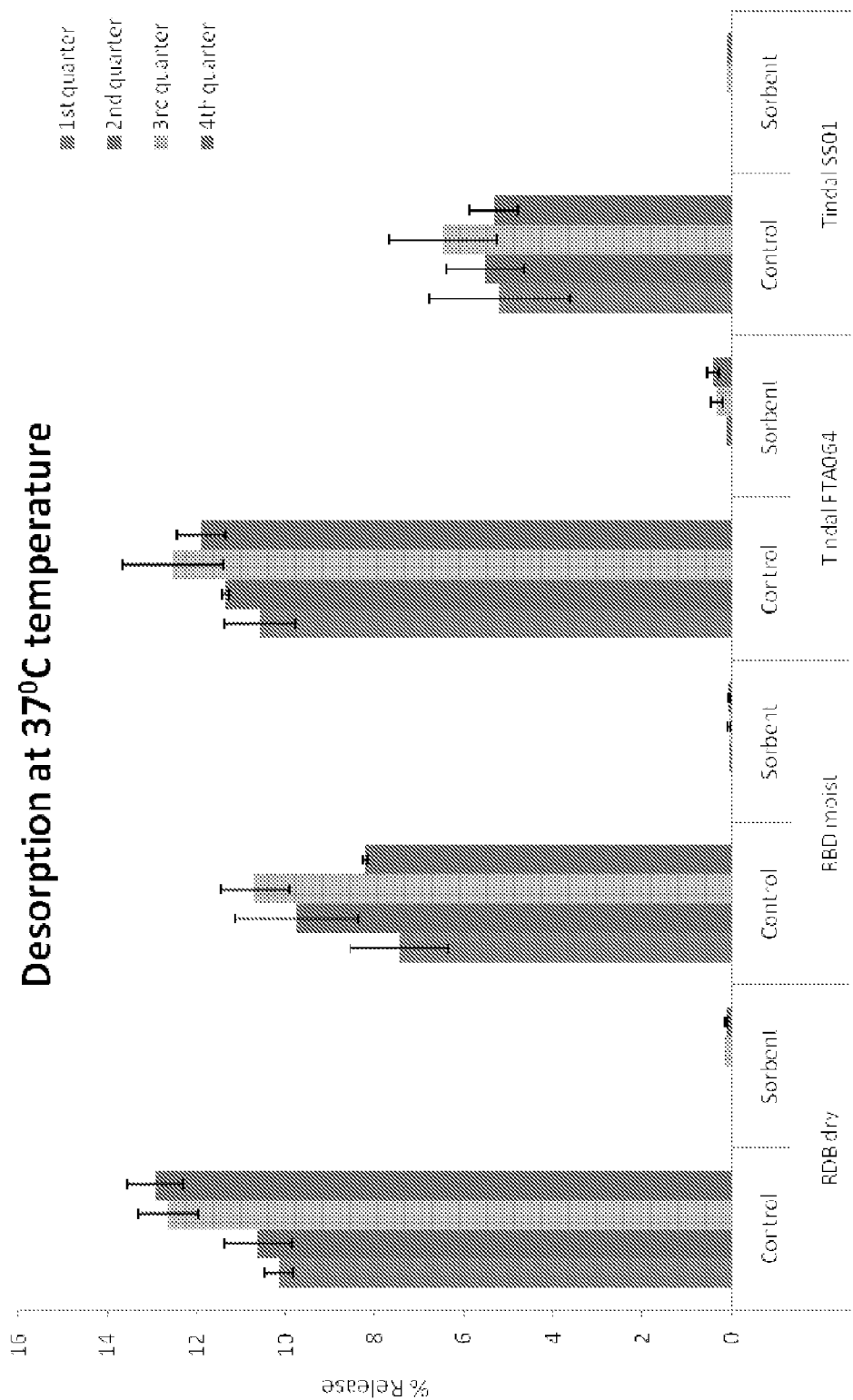
FIG. 13 shows the results of a desorption study for four different field contaminated and spiked soils at 37° C.

As shown in Table 3, below, and FIG. 9, PFOS adsorption by 50 mg MatCARE™ decreased as the level of PFOS added to the solution increased past 6000 µg (300 µg/ml).

TABLE 3

Adsorption efficiency of 50 mg MatCARE ™ at high PFOS concentrations.

| PFOS added (μg) | PFOS adsorbed (μg) | Adsorption ratio |
|---|---|---|
| 6000 | 5514.4 | 91.9% |
| 10000 | 7634.3 | 76.3% |
| 15000 | 7797.6 | 52.0% |
| 20000 | 8513.7 | 42.6% |

EXAMPLE 7

Batch Wastewater Study of PFOS Adsorption by MatCARE™

100 ml samples of wastewater having a PFOS concentration of 110 mg/L and pH of 7.6 were added to varying amounts of MatCARE™. After four-hours shaking, samples were centrifuged, filtered and the supernatant solution was analysed for PFOS using LC-MS analysis.

As shown in Table 4, below, 0.1139 g of MatCARE™ was sufficient to remove more than 75% of PFOS from the wastewater sample. Close to 100% of PFOS was removed from the wastewater sample using 0.5172 g of MatCARE™.

TABLE 4

Adsorption efficiency of MatCARE ™ on PFOS wastewater samples.

| MatCARE ™ mass (g) | Final Conc. (mg/L) | Final pH | % PFOS removed |
|---|---|---|---|
| 0.0257 | 110.8 | 7.76 | 0 |
| 0.0607 | 133.1 | 8.87 | 0 |
| 0.1139 | 26.8 | 9.10 | 75.8 |
| 0.1394 | 36.8 | 9.29 | 67.8 |
| 0.5172 | 0.255 | 8.07 | 99.8 |
| 1.1208 | 0.0355 | 8.33 | 100 |

Based on the batch results, a breakthrough time can be estimated for the column. This breakthrough time can be predicted for different operational conditions of the column e.g. flow rate, column height, etc. The Table 5 below shows an example of the predicted breakthrough times for a 25 mm internal diameter column at a flow rate of 10 ml/min and column height of 10 cm for different PFOS concentrations.

TABLE 5

Predicted breakthrough times for a flow rate of 10 ml/min and column bed height of 10 cm

| Initial concentration (mmol/L) | t* (sec) |
|---|---|
| 1.0E-02 | 1725 |
| 4.0E-03 | 3984 |
| 2.0E-03 | 7390 |
| 4.0E-05 | 53399 |
| 2.0E-05 | 57076 |

The Langmuir equilibrium model was used to determine that the adsorption capacity of MatCARE™ for PFOS is 46.5 mgPFOS/g MatCARE™. As expected, MatCARE™ takes longer to breakthrough because it has a higher affinity for PFOS. For MatCARE™, the breakthrough time increases significantly at lower initial PFOS concentration, which confirms that MatCARE™ has a high affinity for PFOS. These predictions also show that at low concentrations (e.g. $4 \times 10^{-5}$ mmol/L) when MatCARE™ is used as adsorbent it will take a very long time to breakthrough (e.g. 53399 s=14.8 h) These predictions will also be used to determine the amount (mass) of adsorbent that needs to be placed inside the glass column (e.g. 10 cm bed height) using density values.

EXAMPLE 8

Lab Scale Wastewater Study of PFOS and PFOA Adsorption by MatCARE™

A fixed bed column study was conducted using a glass column of 25 mm internal diameter and 500 mm length. The column was packed with 350 g of MatCARE™ to a depth of 300 mm. The column was charged with AFFF (PFOS and PFOA) contaminated wastewater in an upward flow mode at a flow rate of 35 ml/min and 100 L of wastewater was treated. Samples were collected at different volumes (3 L, 6 L, 9 L, 18 L, 27 L, 36 L, 45 L, and 100 L)

As shown in Table 6, levels of PFOS and PFOA after MatCARE™ treatment were below the level of quantitation, indicating that substantially all PFOS and PFOA has been adsorbed to the MatCARE™.

TABLE 6

HPLC analysis of wastewater by volume after passage through column

| Sample | PFOS (ppm) | PFOA (ppm) |
|---|---|---|
| AFFF Wastewater (Initial Concentration) | 9.01 | 2.77 |
| 3 L | <LOQ | <LOQ |
| 6 L | <LOQ | <LOQ |
| 9 L | <LOQ | <LOQ |
| 18 L | <LOQ | <LOQ |
| 27 L | <LOQ | <LOQ |
| 36 L | <LOQ | <LOQ |
| 45 L | <LOQ | <LOQ |
| 100 L | <LOQ | <LOQ |

LOQ = level of quantitation

EXAMPLE 9

Field Scale Wastewater Study of PFOS and PFOA Adsorption by MatCARE™

MatCARE™ (10 kg) was used in an in house designed large scale remediation unit and 10000 L of real AFFF wastewater from a pond was treated. Samples were collected at different volumes (such as 500 L, 1000 L, 1500 L, 2000 L, 2500 L, 3000 L, 7000 L, and 10000 L) and analysed using LC-MS for PFOS and PFOA. The initial concentration of PFOS and PFOA were 35.05 ppm and 6.85 ppm respectively.

As shown in Table 7, levels of PFOS and PFOA after MatCARE™ treatment were below the level of quantitation, indicating that substantially all PFOS and PFOA has been adsorbed to the MatCARE™ and that MatCARE™ is suitable for larger-scale remediation.

TABLE 7

HPLC analysis of wastewater by volume after passage through column

| Sample | PFOS (ppm) | PFOA (ppm) |
|---|---|---|
| AFFF Wastewater (Initial Concentration) | 35.05 | 6.85 |
| 500 L | <LOQ | <LOQ |
| 1000 L | <LOQ | <LOQ |
| 1500 L | <LOQ | <LOQ |
| 2000 L | <LOQ | <LOQ |
| 2500 L | <LOQ | <LOQ |
| 3000 L | <LOQ | <LOQ |
| 7000 L | <LOQ | <LOQ |
| 10000 L | <LOQ | <LOQ |

LOQ = level of quantitation

EXAMPLE 10

Field Scale Wastewater Study of PFOS and PFOA Adsorption to MatCARE™ and Desorption Therefrom Wastewater containing high levels of AFFF contaminants was treated with MatCARE™ in a large scale treatment. Specifically, 82,000 L of waste water was treated using 12 kg MatCARE™ using the same method as described in Example 9. Following treatment, AFFF levels in the water were below the level of quantitation indicating that MatCARE™ is suitable for large scale treatment of AFFF wastewater.

Table 8, shows the concentrations of PFCs removed from the wastewater by MatCARE™. In total, 1111.89 mg of PFCs were removed per kg of MatCARE™.

TABLE 8

Amount of PFCs removed per kg of MatCARE ™

| Contaminant | Conc. (mg/kg) |
|---|---|
| PFHxS | 370.6 |
| PFOS | 259.5 |
| PFOA | 142.7 |
| PFBA | 12.08 |
| PFHA | 327.41 |

To determine whether the PFCs could be desorbed from the MatCARE™ by water, the MatCARE™ used in the large scale treatment of the wastewater was mixed with varying ratios of water. As shown in Table 9, the levels of PFOS and PFOA released from MatCARE™ in the presence of water were below the level of quantitation, indicating a strong association between MatCARE™ and the PFCs.

TABLE 9

Desorption of PFCs from Spent MatCARE ™

| Extractant | PFOS | PFOA |
|---|---|---|
| Water (1:2) | <LOQ | <LOQ |
| Water (1:5) | <LOQ | <LOQ |
| Water (1:10) | <LOQ | <LOQ |
| Water (1:20) | <LOQ | <LOQ |
| Solvent (1:10) | 259.5 | 142.7 |

LOQ = Limit of Quantitation

The water extractions of spent MatCARE™ referred to in the above table were performed as follows: 1 g of MatCARE™ was mixed with 2, 5, 10, 20 ml of water and subjected to end over end rotary shaker for 2 hours. Then the samples were centrifuged, filtered and the supernatant was collected for LC-MS analysis of PFC's present in the spent MatCARE™. For the solvent extraction, an aliquot (25 mL) of 1:1 solvent mixture of Methanol and Ethyl acetate containing 7% orthophosphoric acid was then added to the 1 g (MatCARE™) and equilibrated for 4 hrs in an end-over-end shaker, centrifuged and filtered through hydrophobic PTFE filters for direct HPLC-MS analysis.

EXAMPLE 11

Treatment of AFFF Contaminated Soil Using MatCARE™

Four soil types (Dry RBD, Moist RBD, Tindal SS01 and Tindal FTA 064) contaminated with PFOS were used to investigate the ability of MatCARE™ to adsorb PFOS and maintain the bound PFOS over 300 days. The methods used were essentially as described in Example 2.

The amounts of PFOS present in the contaminated soils are shown in Table 10. The PFOS content of the test soils occur in the following descending order: moist RBD (74.38 ppm)>Tindal FTA 064 (16.17 ppm)>Tindal SS01 (9.26 ppm)>RBD dry (1.83 ppm). The water extractable/bioavailable PFOS concentration of the soils ranged between 0.26 (RBD dry) to 10.57 ppm (RBD moist). The bioavailable fraction corresponds to approximately 14% for RBD soils (dry and moist) and Tindal FTA 064, while 10% for Tindal SS01. The lower content of water extractable/bioavailable PFOS in Tindal SS01 soil might be ascribed to the relatively higher organic carbon and clay content in comparison to the other soils.

TABLE 10

Analysis of PFOS concentration in contaminated soil types

| | PFOS concentration ($\mu$g/g dry soil) | |
|---|---|---|
| Soil | water extract | solvent extract |
| Brown (Dry) RBD | 0.26 | 1.83 |
| Brown (Water logged) RBD | 10.57 | 74.38 |
| Red Tindal FTA 064, SB04 | 2.36 | 16.17 |
| Black Tindal SS01 | 0.93 | 9.26 |

The physico-chemical properties of the impacted soils are shown in Table 11. The RBD soil was acidic with 0.96% Organic Carbon (OC), while the Tindal FTA064 was slightly alkaline having 0.29% OC. The Tindal SS01 soil was neutral with the highest OC content of 2.03%.

TABLE 11

Analysis of contaminated soil types

| Soil | pH | DOC (ppm) | TOC (%) | Moisture content (%) |
|---|---|---|---|---|
| Tindal SS01 | 6.46 | 30.57 | 2.03 | 9.64 |
| RBD | 4.37 | 3.07 | 0.96 | 1.94 |
| RBD (Moist) | 5.90 | 32.22 | 1.63 | 24.56 |
| Tindal FTA 064 | 8.10 | 4.55 | 0.29 | 3.02 |

The treatment study was done with field contaminated soils under two different temperature regimes and the results are presented in Tables 10-12 and FIGS. 10-13. As can be seen from the results presented, MatCARE™ successfully adsorbed the amount of PFOS that was present in the contaminated soils rendering no amount to be bioavailable for at least 300 days of incubation. No detectable amount of PFOS was found to desorb from the adsorbent even at higher temperature conditions over this period of time.

However, to identify the maximum capacity of the MatCARE™, the field contaminated soils were spiked with another 100 ppm of PFOS and studies above were repeated on the spiked soils. This study was also extended for soils incubated at two different temperatures for 300 days and the results are very much similar to field contaminated soils proving the high retaining capacity of PFOS on MatCARE™. There is a little desorption observed but it is of little to no significance compared to the LOQ value.

EXAMPLE 12

Large-Scale MatCARE™ Treatment of AFFF Contaminated Soil

AFFF contaminated soil (7.5 tonnes) was treated using 50 kg of MatCARE™. Large scale remediation of AFFF impacted soils was conducted at a contaminated site in Darwin, Australia. Soils were collected before treatment from a mound which has an approximate mass of 7.5 tonnes. The samples from the treated soil were collected using grid sampling method. The treated and untreated soils samples were extracted using both water and solvent (as previously described) to analyse the content of PFOS using LC-MS. The data presented in the Table 12 shows the water extractable part, which is a more realistic way of desorption for treated and untreated soils. It is clearly seen in the untreated soils that the level of PFOS in all the 12 samples is very high compared to below LOQ values for treated soils.

TABLE 12

Analysis of AFFF in untreated and MatCARE ™ treated soils

| Treated/Untreated | Sample No. | Concentration | |
|---|---|---|---|
| | | Aqueous extract.(ppm) | µg/g soil |
| Untreated | 1 | 1.21 | 5.59 |
| | 2 | 2.68 | 12.33 |
| | 3 | 4.43 | 20.38 |
| | 4 | 2.12 | 9.77 |
| | 5 | 1.40 | 6.42 |
| | 6 | 6.09 | 28.02 |
| | 7 | 2.39 | 11.00 |
| | 8 | 1.63 | 7.51 |
| | 9 | 3.15 | 14.49 |
| | 10 | 2.97 | 13.68 |
| | 11 | 2.01 | 9.25 |
| | 12 | 1.95 | 8.98 |
| Treated | 1 | 0.02 | 0.097 |
| | 2 | 0.01 | 0.045 |
| | 3 | 0.04 | 0.196 |
| | 4 | 0.03 | 0.118 |
| | 5 | 0.01 | 0.062 |
| | 6 | 0.02 | 0.087 |
| | 7 | 0.01 | 0.055 |
| | 8 | 0.01 | 0.060 |
| | 9 | 0.02 | 0.081 |
| | 10 | 0.02 | 0.112 |
| | 11 | 0.02 | 0.096 |
| | 12 | 0.02 | 0.087 |

Figure 14:
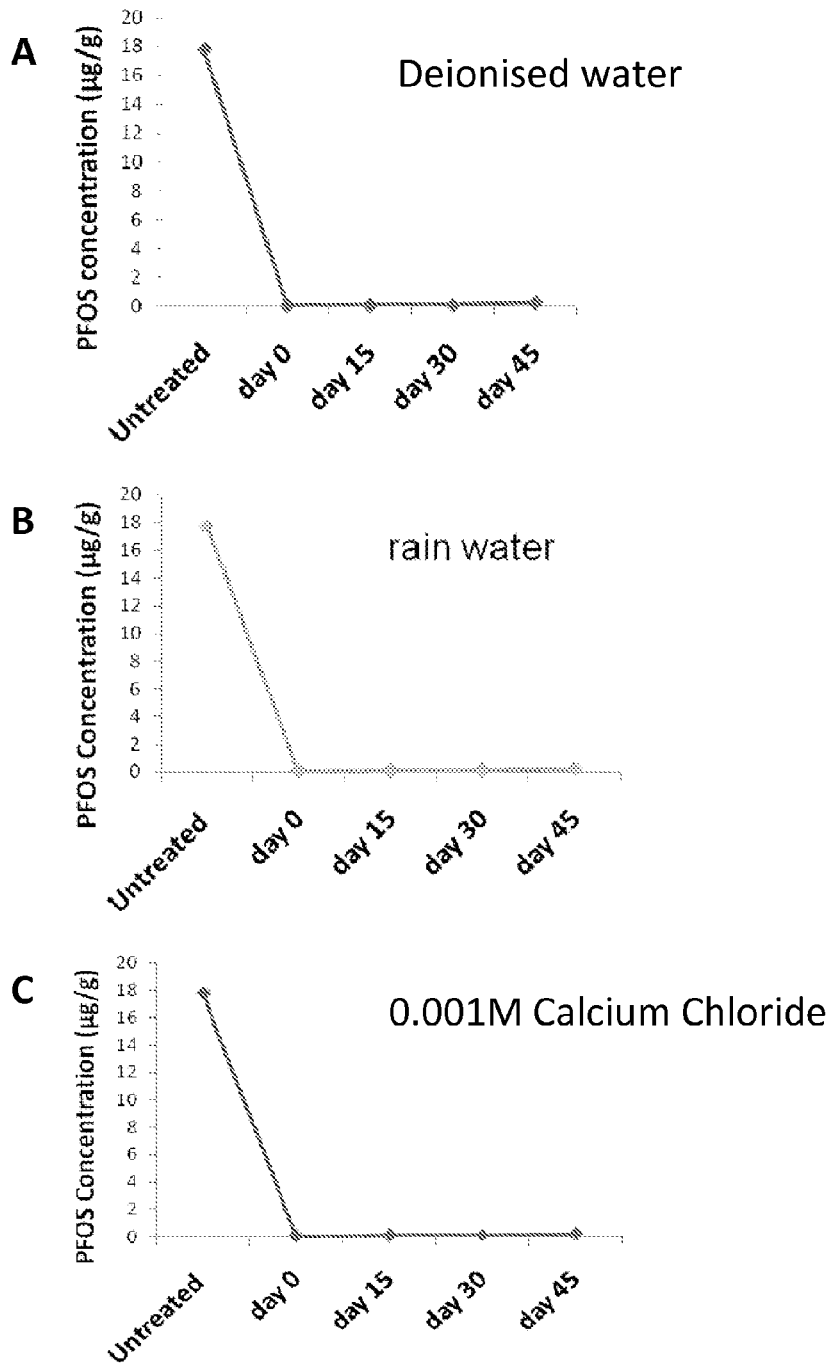
FIG. 14 shows results of a leaching study for PFOS from field treated samples by extracting with different electrolytes.

The field contaminated soils impacted with PFOS were desorbed using different electrolytes to observe the leachability effect using electrolytes such as 0.001M calcium chloride, deionised water and rain water. It can be observed from the results shown in FIG. 14 that no desorption was observed irrespective of the electrolyte used. This confirms the strong boding of PFOS to MatCARE™.

Desorption of treated soils was performed using water (5 g soil+25 ml water) and solvent as described following: An aliquot (25 mL) of 1:1 solvent mixture of Methanol and Ethyl acetate containing 7% orthophosphoric acid was added to 5 g of soil and equilibrated for 4 hrs in an end-over-end shaker, centrifuged and filtered through hydrophobic PTFE filters for direct HPLC-MS analysis.

Those skilled in the art will appreciate that the invention described herein is susceptible to variations and modifications other than those specifically described. It is to be understood that the invention includes all such variations and modifications. The invention also includes all of the steps, features, compositions and compounds referred to, or indicated in this specification, individually or collectively, and any and all combinations of any two or more of the steps or features.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Also, it must be noted that, as used herein, the singular forms "a", "an" and "the" include plural aspects unless the context already dictates otherwise.

The claims defining the invention are as follows:

1. A modified clay sorbent comprising a palygorskite clay modified with a fatty amine, wherein the fatty amine comprises a mixture of oleyl amine and octyl amine, and wherein the mixture comprises 560 mmol of oleyl amine and 120 mmol of octyl amine.

2. A method for separating a contaminant from a sample containing the contaminant, the method comprising contacting the sample with the modified clay sorbent of claim 1 under conditions suitable for sorption of the contaminant to the modified clay sorbent.

3. The method of claim 2, wherein the contaminant comprises at least one of a hydrophobic organic contaminant, a surfactant, an anionic surfactant, a perfluorinated or polyfluorinated compound, an aqueous film forming foam (AFFF) or a constituent thereof, PFOA, and PFOS.

4. The method of claim 2, wherein the sample comprises at least one of water, soil, and sediment.

5. The method of claim 2, wherein the sample is in situ in the environment.

6. A method of preparing a modified clay sorbent for separating a contaminant from a sample, the method comprising the steps of:
   (i) obtaining a palygorskite clay;
   (ii) acid activating a surface of the clay by contacting the surface of the clay with an acid; and
   (iii) adsorbing a fatty amine comprising a mixture of oleyl amine and octyl amine to the acid activated surface of the clay, thereby forming the modified clay sorbent, wherein the mixture of oleyl amine and octyl amine comprises 560 mmol of oleyl amine and 120 mmol of octyl amine.

7. The method of claim 6, comprising the further step of air drying the modified clay sorbent to a constant mass.

8. The method of claim 6, wherein the contaminant comprises at least one of a hydrophobic organic contaminant, a surfactant, an anionic surfactant, a perfluorinated or polyfluorinated compound, an aqueous film forming foam (AFFF) or a constituent thereof, PFOA, and PFOS.

9. The method of claim 6, wherein the sample comprises at least one of water, soil, and sediment.

10. The method of claim 6, wherein the sample is in situ in the environment.

11. The method of claim 6, wherein the mixture of oleyl amine and octyl amine is dissolved in an alcoholic mixture.

* * * * *